E. & G. A. Waters.

Ship Building.

No. 34,35. Reissued. May. 11. 1869

Fig 5. Section on A B.

Witnesses

Marcus P. Norton

Geo. T. Balch

Inventors.

Elisha Waters

Geo. A. Waters

N. PETERS, PHOTO-LITHOGRAPHER, WASHINGTON, D. C.

United States Patent Office.

ELISHA WATERS AND GEORGE A. WATERS, OF TROY, NEW YORK.

*Letters Patent No.* 79,421, *dated June* 30, 1868; *reissue No.* 3,435, *dated May* 11, 1869.

IMPROVEMENT IN BOATS.

The Schedule referred to in these Letters Patent and making part of the same.

*To all whom it may concern:*

Be it known that we, ELISHA WATERS and GEORGE A. WATERS, each residing at the city of Troy, in the county of Rensselaer, and State of New York, have invented new and useful Improvements in Shell-Working or other description of Boats, constructed of or from paper and other material; and we do hereby declare the following specifications of the construction, arrangement, and combination or combinations of certain parts thereof, and operation, or objects, or purpose of the same, to be a full, clear, and exact description of said invention, and also of the method of applying the said invention and improvements herein contained and set forth, reference being had to the accompanying drawings, and to the letters of reference marked thereon, and making a part of this specification and Letters Patent.

Like letters represent and refer to like or corresponding parts.

Figure 5 represents a longitudinal section along the line A–B, fig. 3, and showing the manner of using the inner sheets of paper, or other suitable material, and of different lengths, for the purpose of giving more strength where the most needed, and lightness where less strength is required.

Figure 1:
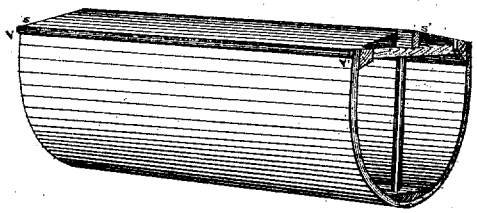
Figure 1 is a perspective view of a section of a "shell-boat," (so called,) and the same is taken on a line at or about six feet from the stern-post.

The invention and improvements contained in the said figs. 1, 2, 3, 4, and 5, of the accompanying drawings, will be more fully described and set forth, as we proceed with this specification and claims, of our said invention and improvements.

The nature of our said invention and improvements relates to the construction and arrangement, as well as the mode or manner of forming, with any suitable paper, the shell or skin, and the decks of boats, so that these parts shall be perfectly water-tight, and each supported by means of ribs, stays, braces, or strips, constructed of paper or of other and suitable material, and so arranged upon the inner side as to render the boats stiffer, stronger, and, at the same time, much lighter, than if made of wood, or of wood and iron combined, in the usual and well-known way or manner.

It also consists in constructing the shell or skin of a boat by the means and use of one or more layers or thicknesses of any suitable paper, securely fastened to each other by some suitable adhesive and water-proof material, and, at the same time, give greater strength to those parts of the boat most subjected to wear, use, or strain, by means and use of sheets of paper, of gradually-increasing width and length, and placed longitudinally or transversely within such boat, according to the position of the part or parts to be strengthened, the whole being arranged and combined in the manner substantially as herein described and set forth.

It also consists in the employment of a shell or skin of a boat, constructed of paper, in the manner substantially as herein described and set forth, in combination with an inner frame-work of suitable construction, and each arranged in the manner, and by the means, and for the purposes substantially as herein described and set forth; and thus, and as herein contained and described, we construct or form a boat, which we denominate a "paper boat," or a boat whose "shell" or "skin" is constructed of or from paper, and having suitable frame-work, stays, braces, or stiffening-strips, therein arranged, substantially as herein set forth and specified.

Having thus described the nature of our said invention and improvements, and in order to enable others skilled in the art to which the same relate, to construct, apply, or use said invention and improvements, we will proceed to describe the same, which are substantially as follows, to wit:

The dimensions and lines of the boat to be built being given, a model or former is constructed of wood or of any other suitable material, conformable thereto, and of the full size and shape or form required, so that the water-lines on its exterior surfaces shall be exactly those desired in the boat to be built.

The said model or former may be made in any way known in carpentering, care being taken to have it sufficiently strong and stiff, so as to bear any heavy pressure on its exterior surface, by, in, or during the putting on the paper coating or layers of paper, or pulp, forming the skin or shell of the boat, and so that it may be turned over and handled while the work of constructing such shell or skin of paper shall be going on, in any manner required.

Figure 2:
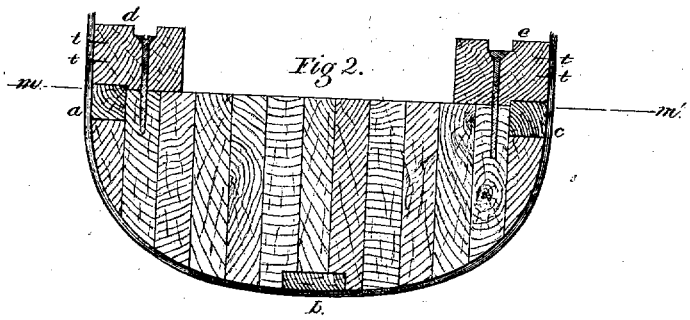
Figure 2 represents a cross-section, on a line at or near midships, of the model or former, over, or on, or by means of which, that part of a boat known and called the skin or shell, is made or constructed, in the manner and by the means, substantially as hereinafter described and set forth.
Figure 3:
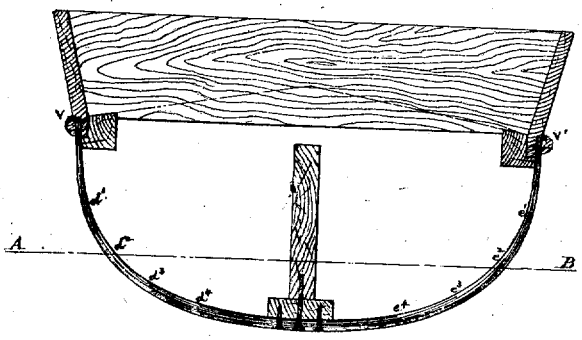
Figure 3 represents a view of a bulkhead or near the end of cockpit in a shell-boat, showing cross-section of combing, gunwales, lower keelson, and upper keelson.

At fig. 2 of the accompanying drawings is shown a cross-section of a model or former, whereon to mould, form, or construct a single-shell boat, in which the breadth, at midships, is about thirteen inches.

Channels are cut in said model or former, or the same are left in the proper places during the construction process, so as to receive the keel, gunwales, and, when required, also, the ribs, braces, stays, or other strengthening-strips or pieces.

Pieces of wood of suitable size will be fitted to these grooves, which are then so worked that exterior surfaces shall form part of, and conform to the surface of the model along such channels, substantially as shown at *a b c*, fig. 2, of said drawings.

Longitudinal strips or pieces, of about two inches in thickness, marked in the cross-section, at *d e*, fig. 2, are then attached, by screws or other suitable means, to the upper plane surface of the model or former, the outer faces of these strips being a continuation of its exterior warped surface, the object of such strips being to afford a means of holding in position the paper composing the said skin or shell, by means of the tacks *t t*, driven through the paper into them, and thus enabling the perfect skin or shell to be cut and separated from the model along the gunwales, at or near the line *m m'*.

The model is now ready to be covered with the paper, which may be either in the form of pulp or of sheets, as the nature of the surface to be covered may require.

The latter are considered preferable, when the surface of the model will admit of their being put on smoothly.

It is desirable that the width of the said sheets should be sufficient to entirely surround the model or former, and extend over the strips *d* and *e*, substantially as shown in said fig. 2; but when it is desirable or intended to strengthen some parts more than other parts, such as those subjected to more wear and strain while in use or operation, sheets of a gradually-increasing width and length are used, or only gradually increasing in their length, while entirely surrounding the said boat, substantially as represented at $d^2$ $d^3$ $d^4$, and $e^2$ $e^3$ $e^4$, fig. 5, of the accompanying drawings, and such strips may be placed longitudinally or transversely, as the case may require.

By so doing, much greater strength is given to all that part of said boat thus constructed, for such serve to brace, stay, support, and to make more stiff, that part of the said boat to which such gradually-lengthened strips may have been applied, as aforesaid.

When it is necessary to enable it to take the form or shape of the model or former perfectly, the paper selected for the first or inner layer may be dampened. It is then placed on the said model, pressed into shape throughout its whole surface, so that it presents neither wrinkle nor unevenness, and tacked to the strips *d e*, fig. 2, accompanying drawings.

Other layers of the paper, composed of one or more sheets, as may be found necessary, and previously saturated, and made perfectly impervious to water throughout the entire fibre, or otherwise treated, according to circumstances, are now superposed on the first layer, each layer being firmly attached to the next one below it, by means of shellac or other suitable adhesive substance, and then and thereafter all such layers are pressed together, so as to form a solid mass of desirable thickness, all depending on the size of the boat to be built, as well as the amount of strength and resistance demanded.

Before the last layer of paper is put on, in the manner aforesaid, the keel is attached to the skin by means of nails and screws, or either, the skin or shell is removed from the model, the interior and necessary frame-work fitted in the proper place, for greater strength and durability, and the skin or shell is firmly attached thereto, substantially as shown in the accompanying drawings.

Figure 4:
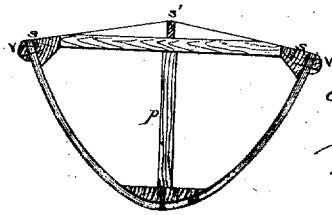
Figure 4 represents a cross-section through a carline of a furnished shell-boat, showing the method or manner of forming, with paper, the skin or shell, and also the deck.
Figure 4:
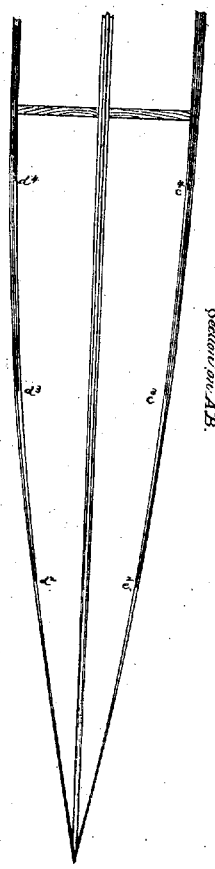

Previous to fitting the said interior frame-work, or additional braces, stays, or ribs, if found necessary to use the posts *p*, the carlines *b c*, fig. 4, are, after being reduced to their minimum size, covered with one or more thicknesses of suitable paper, cemented in place with glue, shellac, or other adhesive and water-proof substance.

A deck, of paper, *s s'*, figs. 1 and 4, is now stretched over such parts of the hull as may be required, or as may require it, and the same is composed of one or more thicknesses or layers of such paper, and resting on a sub-deck of wood, or of other and suitable material, or having no such support, as the case may require.

This deck is formed in the same manner as has hereinbefore been described and set forth, for the said skin or shell, the under layer of paper being firmly attached, by means of suitable water-proof composition, to the wooden deck, or, in the absence of the latter, to such parts of the said frame-work as will properly secure it for the purposes intended.

The edges of the paper are brought over the edges of such skin or shell at the said gunwales, similarly attached to the skin or shell by shellac, or by other water-resisting or water-proof substance or composition, and then a protecting finish by means of the mouldings *v v'*.

Water and air-tight compartments may be made at each end of the hull, by placing bulkheads, of wood, of paper, or of other suitable material, when needed, and covering them with a skin of paper, of any thickness required, at the same time giving thereto any required strength, by any suitable means, and in any manner deemed best.

The said layers of paper will be put together in the manner and by the means, substantially as herein described and set forth.

The surface of the hull may be finished in such manner as to fully resist the action of the water and of the friction against other substances, while in use or operation, in any manner best suited to the use to which said boat is to be put, as experience may dictate, disclose, or suggest.

Having thus described the nature, construction, and mode or manner of constructing and putting into use and operation our original invention and improvements in boats,

What we claim, and desire to secure by Letters Patent of the United States of America, is—

1. The construction of the shell or skin, and the decks (when decks are used) of boats, of or from paper prepared and arranged in a layer or layers, each of which is arranged and combined, one with the other, in the manner and for the purposes substantially as herein described, contained, and set forth.

2. Also, a boat constructed of paper, in the manner substantially as herein described and set forth, and suitably stayed, braced, supported, and strengthened, by means of ribs, stays, braces, or strips, constructed of paper, wood, or other suitable material, and the same arranged upon the inner side of such boat, in the manner substantially as herein described and set forth.

3. Also, the shell or skin of a boat, constructed of paper, in the manner substantially as herein described, in combination with an inner frame-work, suitably constructed, and each arranged in the manner and for the purposes substantially as herein described and set forth.

In testimony whereof, we have, on this 24th day of December, A. D. 1868, in presence of two witnesses, subscribed our names.

ELISHA WATERS.
GEO. A. WATERS.

Witnesses:

MARCUS P. NORTON,
GEO. T. BALCH.